United States Patent
Higashimoto et al.

(10) Patent No.: US 6,722,244 B1
(45) Date of Patent: Apr. 20, 2004

(54) CUTTING MECHANISM FOR SHEET-LIKE CONVEYED MATERIAL AND PHOTOGRAPHIC PROCESSING APPARATUS

(75) Inventors: Yoshihisa Higashimoto, Wakayama (JP); Hiroto Nakao, Wakayama (JP); Junichi Yamamoto, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 0 days.

(21) Appl. No.: 09/626,901

(22) Filed: Jul. 27, 2000

(30) Foreign Application Priority Data

Jul. 27, 1999 (JP) .......................... 11-212510
Sep. 22, 1999 (JP) .......................... 11-269220

(51) Int. Cl.$^7$ ................................ B26D 5/08
(52) U.S. Cl. ........................ 83/614; 83/440; 83/650
(58) Field of Search .................... 83/650, 649, 74, 83/76.8, 80, 162, 211, 60, 63, 64, 65, 66, 67, 371, 441, 440, 440.1, 614, 62, 61; 355/72

(56) References Cited

U.S. PATENT DOCUMENTS

| | | | | |
|---|---|---|---|---|
| 697,902 A | * | 4/1902 | Tripp | 83/614 |
| 1,759,599 A | * | 5/1930 | Yates et al. | 83/614 |
| 3,176,572 A | * | 4/1965 | Comet | 83/649 |
| 3,199,394 A | * | 8/1965 | Castelli | 83/614 |
| 3,277,761 A | * | 10/1966 | Dreher | 83/614 |
| 3,631,979 A | * | 1/1972 | Frankiewicz et al. | 83/80 |
| 3,636,408 A | * | 1/1972 | Shuman | 83/649 |
| 3,659,487 A | * | 5/1972 | Henderson | 83/649 |
| 3,686,991 A | | 8/1972 | Fujimoto | |
| 3,744,362 A | * | 7/1973 | Gesell et al. | 83/62 |
| 3,752,025 A | * | 8/1973 | Van Everdingen | 83/649 |
| 3,981,215 A | * | 9/1976 | Granger et al. | 83/614 |
| 4,147,427 A | * | 4/1979 | Stewart | 355/72 |
| 4,156,382 A | * | 5/1979 | Baker | 83/614 |
| 4,175,460 A | * | 11/1979 | McPhail | 83/440 |
| 4,245,536 A | * | 1/1981 | Urion | 83/614 |
| 4,464,042 A | * | 8/1984 | Omori et al. | 355/3 |
| 4,815,874 A | * | 3/1989 | Richardson et al. | 83/605 |
| 4,823,663 A | * | 4/1989 | Hamlin | 83/208 |
| 4,827,817 A | * | 5/1989 | Grohoski et al. | 83/649 |
| 5,007,171 A | * | 4/1991 | Horning, Jr. | 30/DIG. 3 |
| 5,044,241 A | * | 9/1991 | Labrecque | 83/614 |
| 5,076,555 A | * | 12/1991 | Bunch, Jr. | 225/4 |
| 5,103,710 A | * | 4/1992 | Ross | 83/614 |
| 5,107,734 A | * | 4/1992 | Armbruster | 83/205 |
| 5,357,679 A | * | 10/1994 | Hanna | 30/DIG. 3 |
| 5,360,161 A | | 11/1994 | Schaller et al. | |
| 5,398,576 A | * | 3/1995 | Chiu | 83/614 |
| 5,431,077 A | * | 7/1995 | Murakami | 83/614 |
| 5,555,624 A | * | 9/1996 | McCracken | 30/DIG. 3 |
| 5,556,213 A | * | 9/1996 | Kudo et al. | 83/51 |
| 5,658,083 A | * | 8/1997 | Day et al. | 400/621 |
| 5,695,105 A | * | 12/1997 | Ohara | 225/96 |

(List continued on next page.)

FOREIGN PATENT DOCUMENTS

| | | |
|---|---|---|
| EP | 0 085 773 A1 | 8/1983 |
| JP | 7-271001 | 10/1995 |
| JP | 8-234314 | 9/1996 |
| JP | 8-254809 | 10/1996 |

*Primary Examiner*—Allan N. Shoap
*Assistant Examiner*—Jason Prone
(74) *Attorney, Agent, or Firm*—Knobbe Martens Olson & Bear, LLP (57) ABSTRACT

A cutting mechanism for sheet-like conveyed material comprising: a unit provided across the transfer path for conveying the long sheet-like conveyed material in a lengthwise direction; a movable member provided in the unit for moving forward and backward along a crosswise direction of the transfer path; and a blade mounted on the movable member for cutting the sheet-like conveyed material widthwisely thereof as the movable member is moved.

9 Claims, 10 Drawing Sheets

U.S. PATENT DOCUMENTS

| | | | |
|---|---|---|---|
| 5,712,699 A | * 1/1998 | Tamai | 355/72 |
| 5,771,769 A | 6/1998 | Robertson | |
| 5,823,083 A | 10/1998 | Obertegger et al. | |
| 5,853,101 A | * 12/1998 | Weinstein | 30/124 |
| 5,894,978 A | * 4/1999 | Welch et al. | 225/7 |
| 6,074,113 A | * 6/2000 | Cockerill et al. | 83/162 |
| 6,105,481 A | * 8/2000 | Schuler | 83/614 |
| 6,125,741 A | * 10/2000 | Shorter et al. | 99/537 |
| 6,145,423 A | * 11/2000 | Boreali et al. | 83/145 |
| 6,173,636 B1 | * 1/2001 | Madrzak et al. | 83/601 |
| 6,178,863 B1 | * 1/2001 | Kobayashi et al. | 83/649 |
| 6,223,639 B1 | * 5/2001 | Chen | 83/614 |
| 6,260,457 B1 | * 7/2001 | Hakkaku | 83/614 |
| 6,263,772 B1 | * 7/2001 | Navot et al. | 83/13 |

\* cited by examiner

CUTTING MECHANISM FOR SHEET-LIKE CONVEYED MATERIAL AND PHOTOGRAPHIC PROCESSING APPARATUS

BACKGROUND OF THE INVENTION

1. Field of the Invention

The present invention relates to a cutting mechanism for sheet-like conveyed materials for cutting the long sheet-like conveyed material widthwisely thereof which is conveyed along a transfer path in an apparatus. It also relates to a photographic processing apparatus.

2. Description of the Related Art

In general, a system apparatus such as a photographic processing apparatus or a printing apparatus for use with a long sheet-like conveyed material comprises a plurality of processing units for discrete processes and transfer units disposed between the processing units for communication from one to the other. While the sheet-like conveyed material is being conveyed by the transfer units, it is subjected to the discrete processing actions of the processing units before discharged out as a product at the most downstream of the transfer units.

The action of such a photographic processing apparatus is now explained schematically by way of example. A long sheet-like material or a photosensitive material is supplied from its roll stored in a magazine, cut to a desired length, exposed in the exposure processing unit, developed in the development processing unit, dried in the drying unit, and released as photographs. The transfer units for conveying the photosensitive material are positioned so as to communicate the magazine with the exposure processing unit, the development processing unit, and the drying unit.

The exposure processing unit, the development processing unit, the drying unit, and the transfer unit are separately provided as independent unit mechanisms for ease of assembly and disassembly. In particular, the transfer units are installed at various positions in the apparatus and provided as multiple units. Some of the transfer units are arranged withdrawable out from the apparatus body for ease of maintenance.

However, in any conventional photographic processing apparatus, if the sheet-like conveyed material is jammed on the transfer path by a possible fault, it has to be cut apart by scissors or a cutter knife manually inserted into the apparatus and elaborately accessed to the location of jamming between the units. Then, the relevant unit is unlocked and removed out from the apparatus and a jammed portion of the sheet-like conveyed material is taken out from the unit. Such a troublesome task is generally conducted at a limited narrow space in the apparatus body, hence declining the operability, consuming the time, and discouraging the safety due to the use of scissors or a cutter knife.

SUMMARY OF THE INVENTION

It is thus an object of the present invention, for eliminating the foregoing drawback of the prior art, to provide a cutting mechanism for sheet-like conveyed material and a photographic processing apparatus capable of readily and easily liberating a sheet-like conveyed material jammed and halted while being conveyed along the transfer path.

For achievement of the above object, the cutting mechanism for sheet-like conveyed material according to the present invention is provided comprising: a unit provided across the transfer path for conveying the long sheet-like conveyed material in a lengthwise direction; a movable member provided in the unit for moving forward and backward along a crosswise direction of the transfer path; and a blade mounted on the movable member for cutting the sheet-like conveyed material widthwisely thereof as the movable member is moved.

The cutting mechanism for sheet-like conveyed material permits the blade mounted to the movable member to travel in the crosswise direction of the transfer path when the movable member is moved relative to the unit. Accordingly, the sheet-like conveyed material halted and maintained on the transfer path can be cut apart widthwisely by the blade traveling in the crosswise direction of the transfer path. The sheet-like conveyed material jammed on the transfer path will thus be liberated readily and easily.

The movable member may preferably comprise a pair of strips arranged opposite to each other on both sides of the transfer path while the blade is disposed between the two strips.

This arrangement permits the sheet-like conveyed material to run between the two opposite strips. In case that the sheet-like conveyed material is jammed on the transfer path, it can simply be cut apart by advancing the movable member with the blade mounted between the two strips thereof.

Also, the two strips may preferably be deflected outwardly as spaced increasingly from each other at the upstream end of the transfer path side.

This arrangement of the cutting mechanism for sheet-like conveyed material allows the sheet-like conveyed material, for example, of which the leasing end is slightly skewed as forwarded from the upstream, to be positively guided by the deflected ends of the two strips so as to run between the two strips. Thereby, the sheet-like conveyed material can successfully be conveyed without major interruption.

Alternatively, the cutting mechanism may further comprise a holding means for restricting the forward and backward movement of the movable member in relative to the unit and maintaining the movable member at a given location.

This arrangement eliminates undesired movements of the movable member and can ensure the smooth conveying of the sheet-like conveyed material without major interruption.

The movable member may preferably comprise a through slit provided member which is arranged for moving in a direction widthwisely of the sheet-like conveyed material and has a through slit provided therein through which the sheet-like conveyed material is conveyed along the transfer path, and a blade provided at one end of the through slit thereof along the widthwise direction of the sheet-like conveyed material, wherein the sheet-like conveyed material extending across the through slit can be cut apart with the blade as the through slit member is moved from one position to the other.

This arrangement permits the photosensitive material which is jammed in one of two adjacent units to be cut apart with the blade provided at one end of the through slit when the through slit provided member is moved towards the other end widthwisely of the photosensitive material which remains extending across the through slit in the through slit provided member after the photographic processing action is canceled. Accordingly, a jammed portion of the photosensitive material can be taken out from the unit by an operator of the apparatus. The blade is provided at the one end of the through slit in the through slit provided member and will rarely be interrupted with any other components than the photosensitive material. As a result, a cover for protecting the blade from being interrupted is unnecessary. Since the blade in the cutting mechanism for maintenance task is interrupted by no other components but the photosensitive material, the entire arrangement of the cutting mechanism can be simplified.

Alternatively, the cutting mechanism for sheet-like conveyed material may further comprise an urging means for urging the through slit provided member in a direction opposite to the direction for cutting the sheet-like conveyed material, and a positioning means for positioning the through slit provided member so that the sheet-like conveyed material is conveyed across the through slit of the through slit provided member, the positioning means having a stopper thereof for halting the movement of the through slit provided member driven by the urging force of the urging means.

This arrangement allows the through slit provided member to be returned back to its original position by the yielding force of the urging means after the cutting action and held at the position with the stopper so that the photosensitive material can pass across its through slit. Accordingly, the positioning of the through slit provided member or the positioning for allowing the photosensitive material to pass across the through slit in the through slit provided member will be conducted easily and certainly.

The urging means may preferably be a coil spring while the through slit provided member is a portion of the coil spring.

This arrangement can make a combination of the urging means and the through slit provided member more simple.

A photographic processing apparatus according to the present invention is provided comprising at least two or more units, each having a transfer path for conveying a long sheet-like conveyed material or a photosensitive material in the lengthwise direction, the units aligned in the apparatus body with their transfer paths connecting one another, at least one of the units arranged withdrawable out from the apparatus body in a crosswise direction of the transfer path. More particularly, a movable member is accommodated in the withdrawable unit for moving forward and backward in the crosswise direction of the transfer path. The movable member includes a blade for cutting the photosensitive material as the movable member is moved.

This arrangement permits the photosensitive material, when it is jammed, to be cut apart by the movable member simply moved widthwisely of the photosensitive material with no use of scissors or the like inserted and accessed to the location of jamming in the apparatus. More particularly, in case that the photosensitive material is jammed and halted between the two units to interrupt the relative action of the two units, it can be cut apart hence allowing the relevant unit to be withdrawn from the apparatus. A jammed portion of the photosensitive material will then be taken out from the unit readily and easily.

Another photographic processing apparatus according to the present invention is provided comprising: at least two or more magazines disposed in the apparatus body, each magazine arranged in which a roll of photosensitive material is stored as a long sheet-like conveyed material; a transfer path disposed in the apparatus body and arranged to communicate with the feed outlet of each magazine and combine its branches to one path at the downstream; and a transfer unit disposed in the apparatus body and arranged to selectively convey one of at least two or more sheets of the photosensitive material along the transfer path. The transfer unit has movable members disposed therein, each movable member arranged opposite to the feed outlet of the corresponding magazine for moving forward and backward in a crosswise direction of the transfer path. The movable member includes a blade for cutting the photosensitive material widthwisely thereof as the movable member is moved.

This arrangement permits the movable member to be withdrawn when the photosensitive material is jammed while conveyed from the magazine to the transfer unit. After the photosensitive material is cut apart between the magazine and the unit, the unit is removed out from the apparatus body. Finally, a jammed portion of the photosensitive material is taken out from the unit which has been removed out from the apparatus body.

BRIEF DESCRIPTION OF THE DRAWINGS

FIG. 5 illustrates an entrance guide of the apparatus, FIG. 5(a) being a plan view, FIG. 5(b) being a cross sectional view taken along the line A—A of FIG. 5(a), and FIG. 5(c) being a view seen from the direction of the arrow B shown in FIG. 5(a);

FIG. 7 illustrates schematic perspective views of the entrance guide, FIG. 7(a) showing a photosensitive material in its conveyed position, FIG. 7(b) showing the photosensitive material partially cut, and FIG. 7(c) showing the photosensitive material completely cut apart;

DETAILED DESCRIPTION OF THE PREFERRED EMBODIMENTS

Embodiments of a photographic processing apparatus according to the present invention will be described in more detail referring to the relevant drawings.

Figure 1:
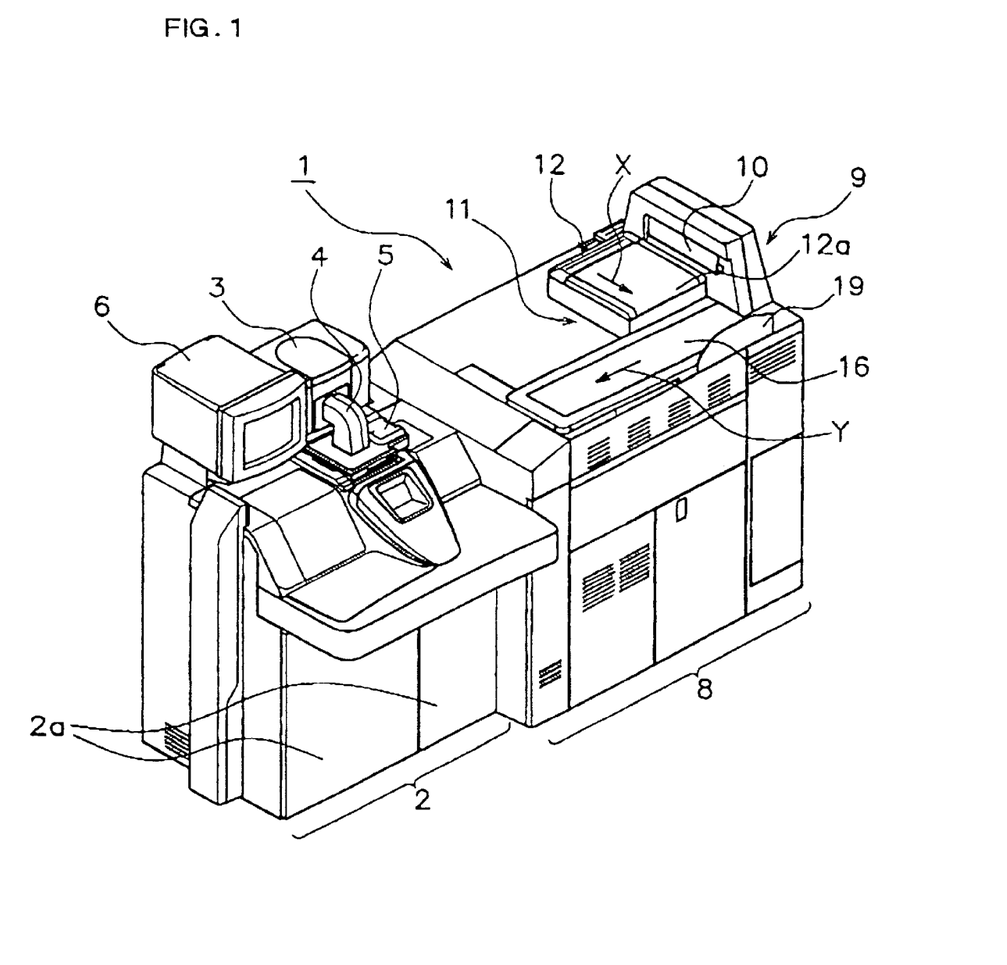
FIG. 1 is a schematic perspective view of a photographic processing apparatus according to one embodiment of the present invention.

FIG. 1 is a schematic perspective view of the photographic processing apparatus of one embodiment. The photographic processing apparatus body 1 comprises an exposure module 2 for cutting a roll of photosensitive material (a conveyed sheet material) to pieces of a predetermined length and projecting images recorded on a photography film onto the photosensitive material pieces for exposure, a development processing module 8 for subjecting the exposed photosensitive material pieces to a development process, a drying process unit 9 for drying the developed photosensitive material pieces, and a sorting unit 11 for sorting the dried photosensitive material pieces in a given order.

The exposure processing module 2 includes an exposure unit for exposing each photosensitive material piece positioned on its exposure stage and a transfer unit for conveying the photosensitive material from a magazine to the exposure stage which all are accommodated inside covers 2a. A lens unit is provided orthogonal to the photosensitive material piece positioned on the exposure state so that light emitted from a light source 3 is reflected on a mirror tunnel 4, passed through the image on the film held in a film mask 5, and projected onto the lens unit. A monitor 6 is mounted on the exposure processing module for displaying the image scanned by a scanner unit.

The development processing module 8 conducts development, bleaching, fixing and stabilization of the exposed photosensitive material. It incorporates a dark room for preventing the exposure to any stray light from the outside. In the development processing module 8, the development unit consists of a development tank, a fixing tank, and a stabilizing tank aligned along the direction of conveying of the photosensitive material. For conveying the photosensitive material at a constant speed through the processing tanks, a transfer unit is provided including transfer rollers and conveying belts.

The drying processing unit 9 is provided for drying the developed photosensitive material and includes a blower for blowing hot air to the photosensitive material being conveyed. The drying unit 9 extends upwardly of the apparatus for discharging the dried photosensitive material from its outlet 10 located at the top.

The sorting unit 11 comprises a first transfer unit 12 for conveying the photosensitive material discharged from the outlet 10 in the X direction oriented at substantially a right angle to the conveying direction, a second transfer unit 16 provided adjacent to the downstream end 12a of the first transfer unit 12 for conveying the photosensitive material received from the first transfer unit 12 in the Y direction oriented substantially in parallel with the conveying direction in the apparatus, and a contact plate 19 provided opposite to the first transfer unit 12, both sandwiching the second transfer unit 16. The contact plate 19 is a planar strip anchored to the apparatus body 1 for halting the photosensitive material released out from the downstream end 12a of the first transfer unit 12 and dropping the same on the second transfer unit 16.

Figure 2:
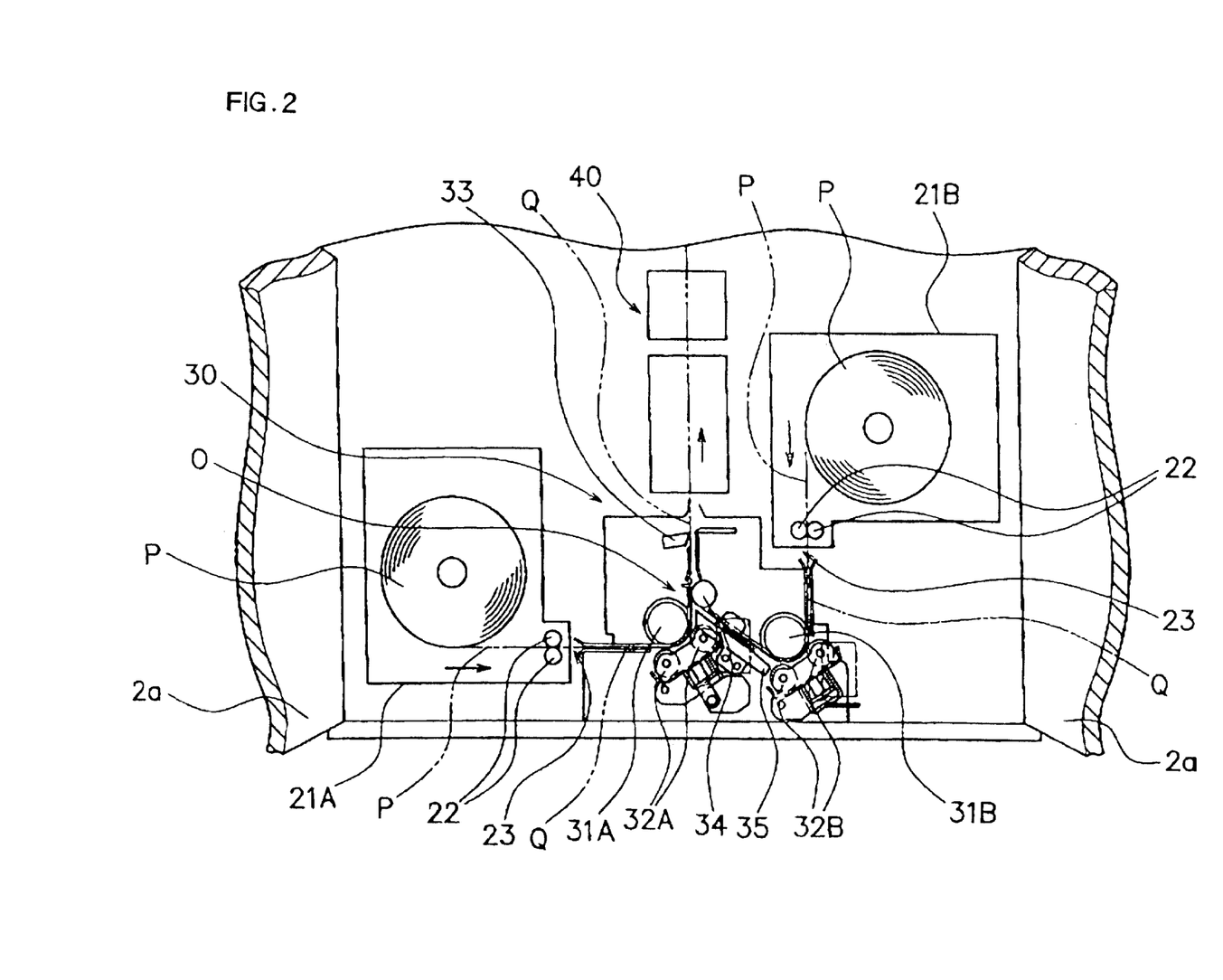
FIG. 2 is a schematic cross sectional view of an exposure module in the photographic processing apparatus shown in FIG. 1.
Figure 3:
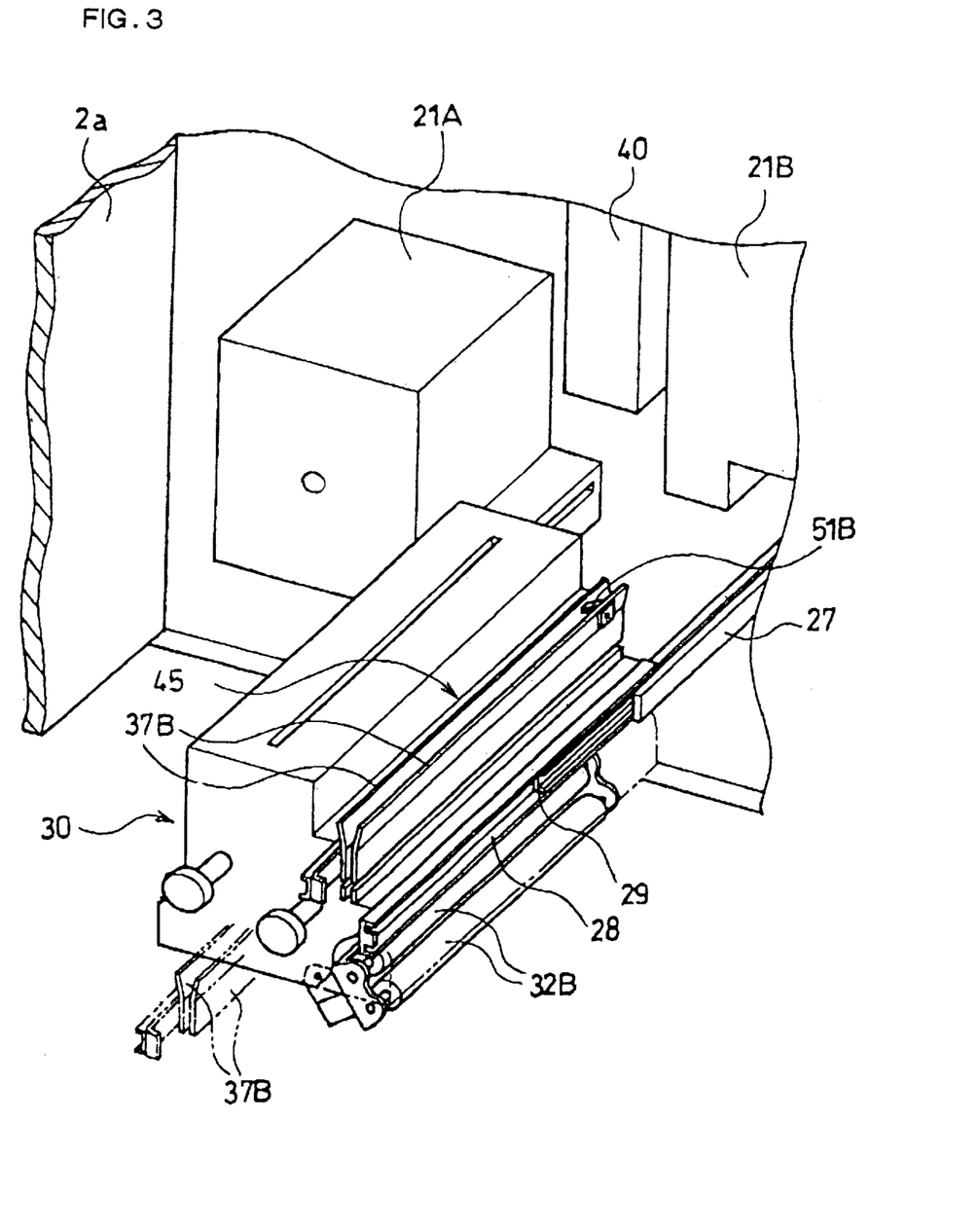
FIG. 3 is a schematic perspective view showing a first transfer unit withdrawn from the apparatus.

FIG. 2 is a schematic cross sectional internal view of the exposure processing module 2 of the photographic processing apparatus shown in FIG. 1. FIG. 3 is a schematic perspective internal view of the exposure processing module 2 of the photographic processing apparatus shown in FIG. 1. More specifically, components and their arrangement are shown in cross section with the covers 2a removed. The exposure processing module 2 according to the present invention includes a photosensitive material supplying means for supplying the photosensitive material P as well as the second transfer unit 40 for conveying the photosensitive material P to the exposure stage (not shown).

The photosensitive material supplying means comprises a combination of a first magazine 21A and a second magazine 21B in which the photosensitive material P is stored in a roll and the first transfer unit 30 for conveying the photosensitive material P to the second transfer unit 40 at the downstream.

In the magazine 21A or 21B, a roll of the photosensitive material P is sandwiched between and conveyed by a pair of magazine rollers 22, 22. The magazine 21A or 21B is formed of a box-like shape having a feed outlet 23 (an opening at the downstream of the magazine rollers 22, 22) for feeding out the photosensitive material P.

The first transfer unit 30 is installed so that it can be drawn out from the apparatus body 1 crosswisely of the conveying direction. More particularly, while a stationary rail 27 is provided in the apparatus body 1, the first transfer unit 30 has a first slide rail 28 and a second slide rail 29 disposed corresponding to the shape and the location of the stationary rail 27 (as shown in FIG. 3, the first transfer unit 30 can be traveled to and from the apparatus body 1 with its first 28 and second slide rail 29 running on the stationary rail 27).

The first transfer unit 30 also contains transfer sections consisting mainly of a first advancing roller 31A and a second advancing roller 31B and a first set of pressing rollers 32A and a second set of pressing rollers 32B, a cutter 33 for cutting widthwisely the photosensitive material P, a guide roller 34 for guiding the traveling of the photosensitive material P, and a guide plate 35 for guiding the photosensitive material P from the advancing roller 31B to the guide roller 34.

More specifically, in each transfer roller section, the first advancing roller 31A or the second advancing roller 31B is arranged for withdrawing the photosensitive material P a given length from the magazine 21A or 21B while the first set of pressing rollers 32A or the second set of pressing rollers 32B are disposed for conveying the photosensitive material P which is sandwiched between the advancing roller 31A (or 31B) and the pressing rollers 32A (or 32B).

The two roller transfer sections in the first transfer unit 30 are disposed close to each other for best utilizing the space defined by the covers 2a in the exposure processing module 2. Each the transfer roller section accompanied with the magazine 21A or 21B is located opposite to the feed outlet 23 of the magazine 21A or 21B.

In this embodiment, the magazines 21A, 21B are provided on both sides of the first transfer unit 30 with the feeding direction of the photosensitive material P from each magazine 21A or 21B matching the conveying direction across the first transfer unit 30. More specifically, the photosensitive material P is released substantially in the horizontal direction from the first magazine 21A while substantially in the vertical direction from the second magazine 21B.

Referring to FIG. 2, the arrows denote the conveying directions of the photosensitive material P in the magazines 21A and 21B as well as in the second transfer unit 40. In the first transfer unit 30, there is a conveying path Q which is a part of the transfer path of the photosensitive material P for photographic processing, where the photosensitive materials P released from the feed outlets 23 of the two magazines 21A, 21B are conveyed after combined at the junction (at point 0). Each photosensitive material P is passed between the advancing roller 31A (or 31B) and the pressing rollers 32A (or 32B) over the guide plate 35 and conveyed via the guide roller 34 to the second transfer unit 40 before transferred to the exposure stage as described.

Figure 4:
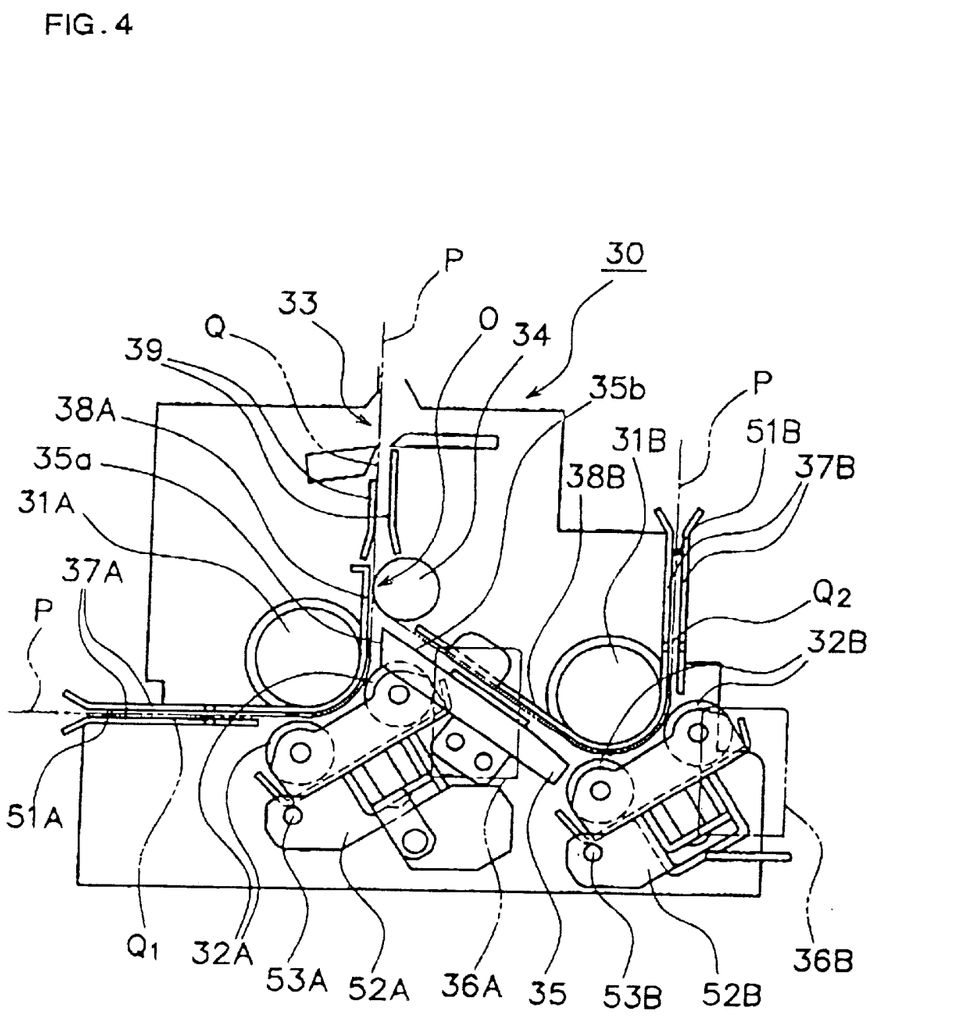
FIG. 4 is an enlarged view of a paper processing section in the module shown in FIG. 2.

FIG. 4 illustrates an enlarged view of the first transfer unit 30 of FIG. 2. The pressing rollers 32A and 32B paired with the advancing rollers 31A and 31B respectively are anchored to the corresponding positions to the advancing rollers 31A and 31B in the first transfer unit 30 by locking mechanisms, namely a first snap lock 36A and a second snap lock 36B. In more detail, the advancing roller 31A (or 31B) is secured to the pressing rollers 32A (or 32B) by the snap lock 36A (or 36B) so that the photosensitive material P can successfully be conveyed between the advancing roller 31A (or 31B) and the pressing rollers 32A (or 32B). The snap lock 36A (or 36B) is located at an appropriate position in the front end (behind the covers 2a) of the first transfer unit 30 so as not to interrupt the action of the advancing roller 31A (or 31B).

The photosensitive material P supplied from the first magazine 21A is introduced through a first entrance guide 37A and passed between the advancing roller 31A and the pressing rollers 32A as running along a first sub transfer path Q1 via a first advancing roller guide 38A and a first guide 35a of the guide plate 35 to the guide roller 34. Then, the photosensitive material P is passed through a pre-cutter guide 39 along the transfer path Q and further conveyed along the path after the cutter 33.

The feed (a length) of the photosensitive material P supplied from the first magazine 21A is determined by the number of revolutions (a pulse signal) of the first advancing roller 31A. The action of the cutter 33 is thus controlled by the pulse signal to cut the photosensitive material P to a desired length.

Similarly, the photosensitive material P supplied from the second magazine 21B is introduced through a second entrance guide 37B and passed between the advancing roller 31B and the pressing rollers 32B as running along a second sub transfer path Q2 via a second advancing roller guide 38B and a second guide 35b of the guide plate 35 to the guide roller 34. Then, the photosensitive material P is passed along the transfer path Q linked to the first sub transfer path Q1 and further conveyed along the path after the cutter 33.

The feed (a length) of the photosensitive material P supplied from the second magazine 21B is also determined by the number of revolutions (a pulse signal) of the second advancing roller 31B. The action of the cutter 33 is thus controlled by the pulse signal of the feed (from the second advancing roller 31B) to cut the photosensitive material P supplied from the second magazine 21B to a desired length.

Figure 5:
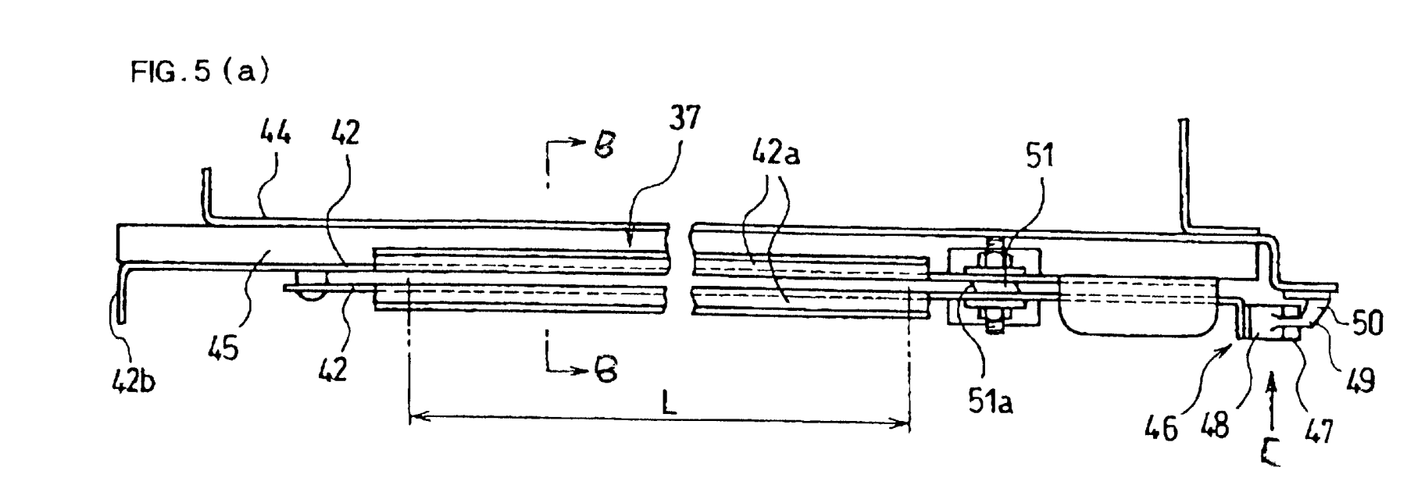

FIG. 5(a), (b),(c) illustrates a plan view, a cross sectional view, and a partial side view of the entrance guide 37 of FIG. 3. The entrance guide 37 comprises a couple of rectangular strips (guiding plates) 42, 42 disposed in opposite sides of the transfer path Q respectively. The two strips 42, 42 are spaced from each other and extend lengthwisely in parallel to each other. Also, each strip 42 has an upstream end 42a thereof along the transfer path Q deflecting outwardly so that the two strips 42, 42 are more spaced from each other at the end 42a opposite to the feed outlet 23 of the magazine 21.

The two strips 42, 42 are sized with its width at the upstream end 42a greater than the width L of the photosensitive material P. A flat sheet-like blade 51 bridges over the two strips 42, 42 at the lengthwise inward end of the entrance guide 37A or 37B (inwardly of the covers 2a). The blade 51 may be a cutter blade of which the edge 51a is preferably slant along the width in direction of the transfer path Q.

While the first transfer unit 30 includes a stationary rail 44, a slide rail 45 is disposed in the entrance guide 37 corresponding to the shape and the location of the stationary rail 44. The slide rail 45 is fixedly mounted to one of the two strips 42. Also, the stationary rail 44 is fitted so as to extend along the inner wall of the slide rail 45. As the slide rail 45 slides along the stationary rail 44, the entrance guide 37 moves to and from the first transfer unit 30. The entrance guide 37 is a movable member for traveling forward and backward along the crosswise direction of the transfer path Q widthwisely of the photosensitive material P. The other strip 42 has a grip portion 42b of substantially an L shape provided on the proximal end thereof.

The entrance guide 37 is maintained to a given location (where the photosensitive material P is conveyed in a normal mode through the corresponding entrance guide 37A or 37B, i.e. the corresponding entrance guide 37A or 37B is retracted within the apparatus body 1) by a holding means 46 which limits the forward and backward movement of the entrance guide 37 to the first transfer unit 30.

The holding means 46 is so-called a roller catcher including an engaging projection 47 with a bulged head mounted to the inward end of the movable entrance guide 37 and an engaged member 50 which has a flexible joint member 49 of substantially a U shape, when seen from above, mounted on a pair of column-like pins 48, 48 arranged in parallel to each other and spaced from each other by a given distance in the first transfer unit 30. When the entrance guide 37 is pressed into the apparatus body 1, the engaging projection 47 advances towards the two pins 48, 48, separate the two pins 48, 48 from each other, and goes through the two pins 48, 48 until its head moves in the engage member 50. As the neck of the engaging projection 47 just stays between the two pins 48, 48, the two pins 48, 48 are sprung back. Accordingly, the head of the engaging projection 47 is held at the proximal end with two pins 48, 48 thus canceling the forward and backward movement of the entrance guide 37.

The blades 51A and 52B remain distanced from the photosensitive materials P when the entrance guides 37A and 37B are held not to move forward and backward (in the normal mode). In the normal mode, the photosensitive materials P being conveyed are free from the blades 51A and 51B. As the entrance guides 37A and 37B have been slid relatively, the blades 51A and 51B come to their positions for cutting the photosensitive materials P.

In the first transfer unit 30 in the embodiment, the pressing rollers 32A and 32B are held by their respective first roller holder 52A and second roller holder 52B. The pressing rollers 32A and 32B are assembled integral with their respective roller holders 52A and 52B.

The guide plate 35 is fixedly mounted to the first roller holder 52A so that its first guide 35a allows the photosensitive material P to be properly supported between the first advancing roller 31A and the first advancing roller guide 38A and its second guide 35b allows the photosensitive material P to be properly supported between the second advancing roller 31B and the second advancing roller guide 38B.

The roller holders 52A and 52B are supported by pin-like supports 53 (a first support 53A and a second support 53B) at specific locations in the first transfer unit 30. The roller holders 52A and 52B are also arranged pivotable about their corresponding supports 53A and 53B. Accordingly, it is possible that the first pressing rollers 32A and the guide plate 35 held by the first roller holder 52A together are turned about the first support 53A while the second pressing rollers 32B held by the second roller holder 52B together are turned about the second first support 53B.

Figure 6:
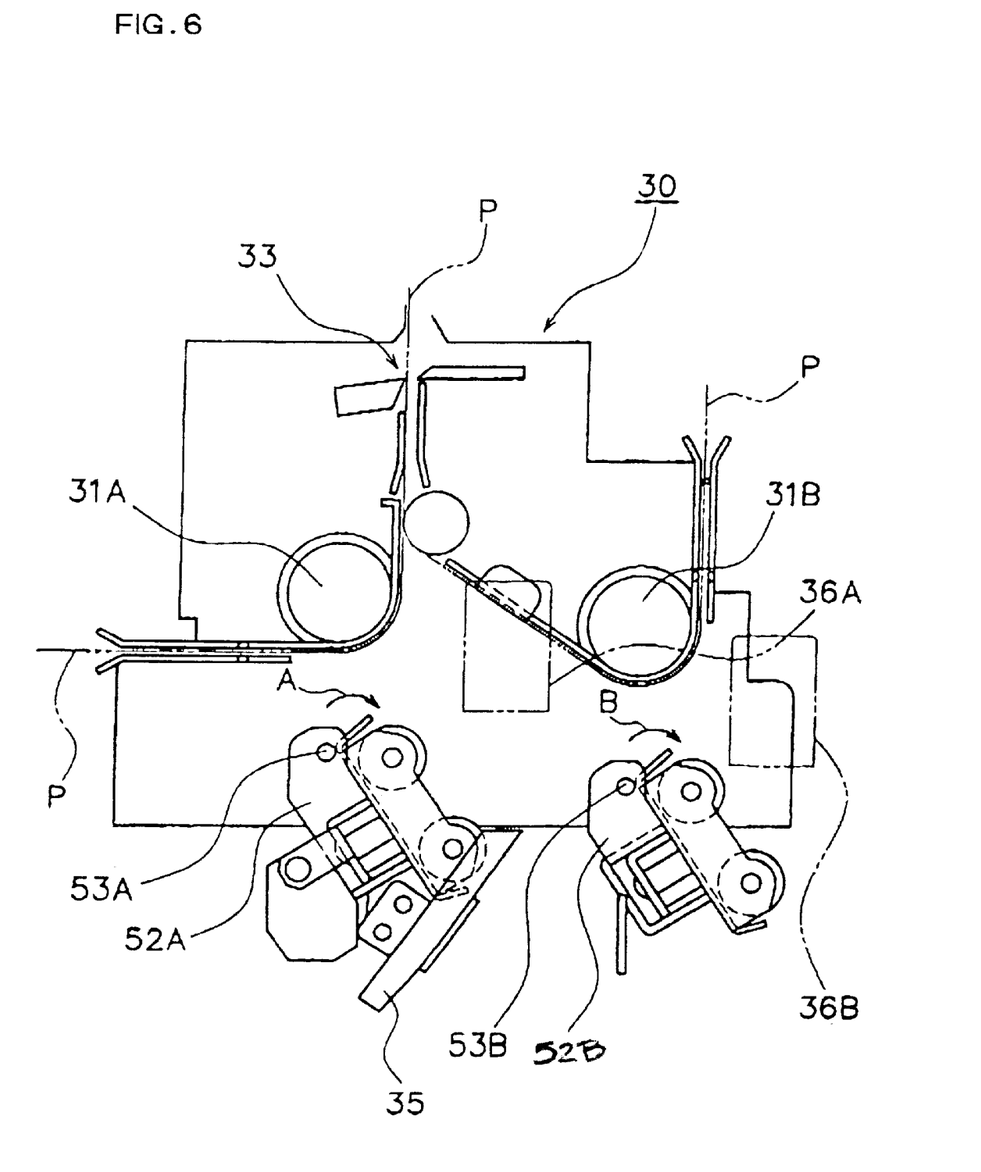
FIG. 6 is a schematic view showing pressing rollers disengaged from their advancing roller in the paper processing section shown in FIG. 4.

FIG. 6 illustrates schematically the first transfer unit 30 where the pressing rollers 32A, 32B are disengaged from the advancing rollers 31A, 31B. The "disengaged" condition means that the pressing rollers 32A, 32B are not completely removed from the first transfer unit 30 but only distanced from the advancing rollers 31A, 31B (while being supported by their respective supports 53) for the ease of carrying out a maintenance task about the advancing rollers 31A, 31B.

As shown in FIG. 6, the turning of the first roller holder 52A about the first support 53A in the direction denoted by the arrow A can release the engagement between the first advancing roller 31A and the first pressing rollers 32A and then isolate the first pressing rollers 32A and the guide plate 35. Similarly, the turning of the second roller holder 52B about the second support 53B in the direction denoted by the arrow B can release the engagement between the second advancing roller 31B and the second pressing rollers 32B and then isolate the second pressing rollers 32B.

More particularly, in the photographic processing apparatus shown in FIGS. 1 to 6, the pressing rollers 32A, 32B with the guide plate 35 which are pivotable about the supports 53A, 53B are properly positioned and engaged with their respective advancing rollers 31A, 31B by locking the roller holders 52A, 52B with their corresponding snap locks 36A, 36B. With that state, the photosensitive materials P are supplied and subjected to the exposure process and the development process of a photographic method.

Figure 7A:
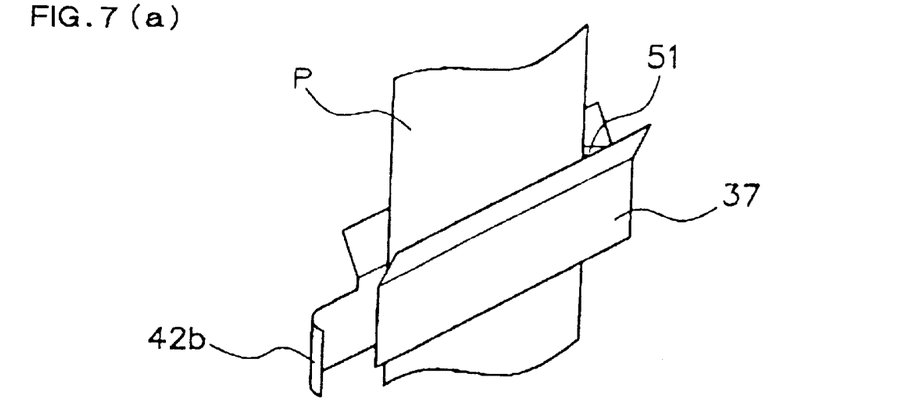
Figures 7B, 7C:
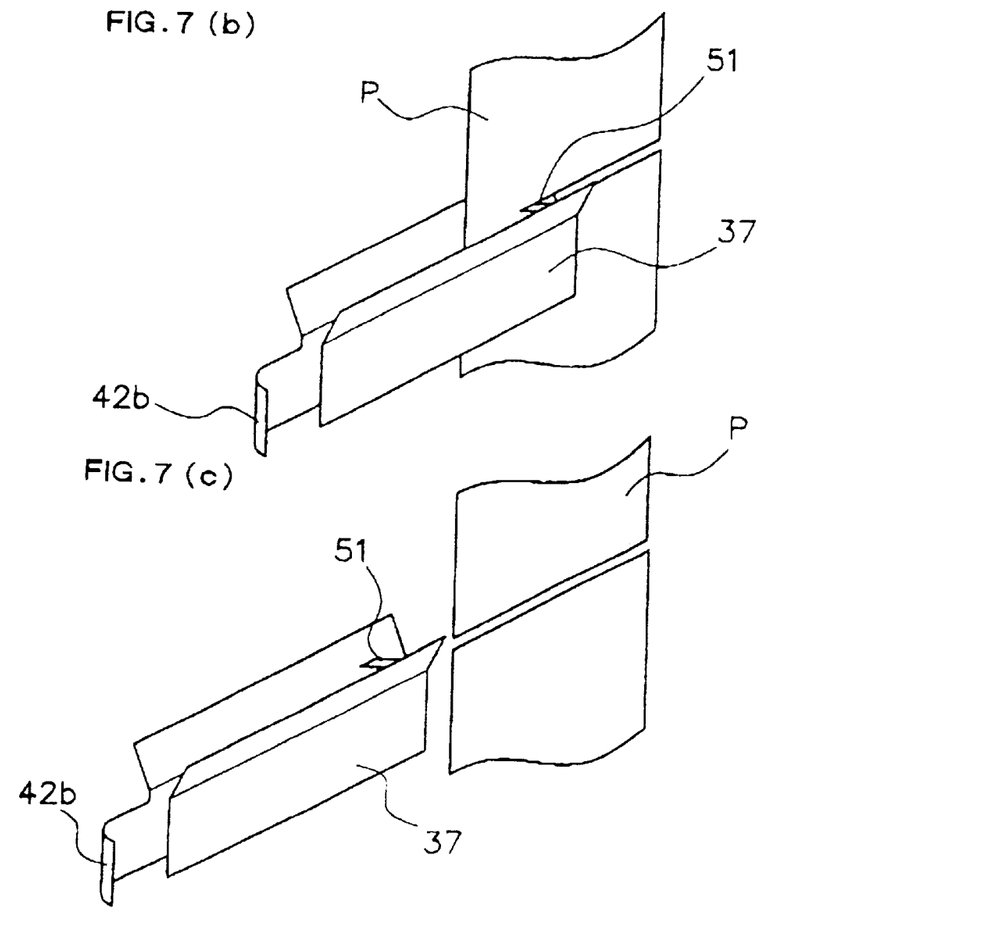

When the photosensitive material P is halted on the transfer path by jamming as shown in FIG. 7(*a*), the entrance guide 37 is drawn out from the apparatus by pulling its grip 42*b*. While the entrance guide 37 is being withdrawn, the blades 51 move in a crosswise direction of the transfer path and cut off the photosensitive materials P (FIG. 7(*b*)). The photosensitive materials P are completely cut off with the blades 51 have been moved across the transfer path (FIG. 7 (*c*)). The photosensitive materials P can successfully be cut off by pulling the entrance guide 37.

As the photosensitive materials P have been cut off, the first transfer unit 30 is taken out from the apparatus body 1. After the first transfer unit 30 is taken out, the snap locks 36A, 36B holding the roller holders 52A, 52B are unlocked and the roller holders 52A, 52B are turned to disengage and separate the pressing rollers 32A, 32B and the guide plate 35 from the advancing rollers 31A, 31B. By manually rotating the advancing rollers 31A, 31B, the remaining of the photosensitive materials P in the first transfer unit 30 is removed off.

The photographic processing apparatus of the embodiment can thus provide such advantages as described below.

According to the embodiment, if jamming occurs during the traveling of the photosensitive materials P from the magazines 21A, 21B to the first transfer unit 30, a jammed portion of the photosensitive material P can easily be cut and removed out from the apparatus body 1 by simply withdrawing the movable assembly 37 of the first transfer unit 30. This eliminates such a troublesome task as of accessing deep in the apparatus body 1 and cutting a jammed portion of the photosensitive material P with scissors or a cutter. In the embodiment, any unwanted portion of the photosensitive materials P can readily be cut and removed away.

After the jammed material is removed, a maintenance job can be conducted about the advancing rollers 31A, 31B with the pressing rollers 32A, 32B not removed out but just separated from the advancing rollers 31A, 31B. The removal of a jammed material or the maintenance will thus be carried out in a simpler manner than any conventional apparatus which has to first account the storage of removed components.

OTHER EMBODIMENT OF THE INVENTION (1) The photographic processing apparatus of the embodiment described above is based on but not limited to a sheet form of the photosensitive material and a cutting mechanism adapted for the sheet photosensitive material. The embodiment may also be applicable to any apparatus for handing a sheet-like conveyed material, such as a printing apparatus. As a different sheet-like conveyed material requires a different handling, the quality, hardness, and shape of the blades has to be modified depending on the material in the apparatus.

(2) The cutting mechanism for a sheet-like conveyed material according to the present invention is closely linked with but not limited to the magazines and the transfer units in the photographic processing apparatus. It may be operable with any other unit with equal success. For example, a photographic processing apparatus may have a relatively long transfer path from the exposure process to the development process along which a plurality of transfer units isolated mechanically from each other are disposed. When those transfer units are movable from the apparatus body, can equally be applied to the units.

The cutting mechanism for a sheet-like conveyed material according to the present invention can also be applied to a combination of the exposure processing unit an the transfer unit or the development processing unit and the transfer unit.

(3) The embodiment of the cutting mechanism is implemented by a pair of opposite planar strips and a blade provided between the two strips and serves as a paper guide (a guiding means) for preventing the photosensitive material from diverting from the transfer path. The cutting mechanism of the present invention is however not limited to such a combination of the components but may be a movable assembly which is equipped with a blade for cutting the photosensitive material and can travel in a crosswise direction of the transfer path as falling within the scope of the present invention.

(4) The "unit 30" in the embodiment includes a concept of the main assembly of the photographic processing apparatus and is not limited to the movable transfer unit of the embodiment. A movable mechanism (including the entrance guide) maybe separated from the transfer unit and installed directly to the main assembly of the photographic processing material. In the that case, the mechanism should be arranged movable forward and backward in a crosswise direction of the transfer path.

(5) The "crosswise direction of the transfer path" is not limited to at a right angle to the lengthwise direction of the transfer path as described with the embodiment but may be at an angle to the lengthwise direction of the transfer path. It is essential to cut the sheet-like conveyed material apart by the movement of a blade.

(6) Although the movable member and the blade are separated from each other in the embodiment, they may be formed of a single unit.

(7) The present invention is described in the form of but not limited to an analog type of the photographic processing apparatus where two supply magazines are installed in the exposure module. The present invention is successfully applicable to a digital photographic processing apparatus having magazines disposed outside the apparatus body.

Figure 8:
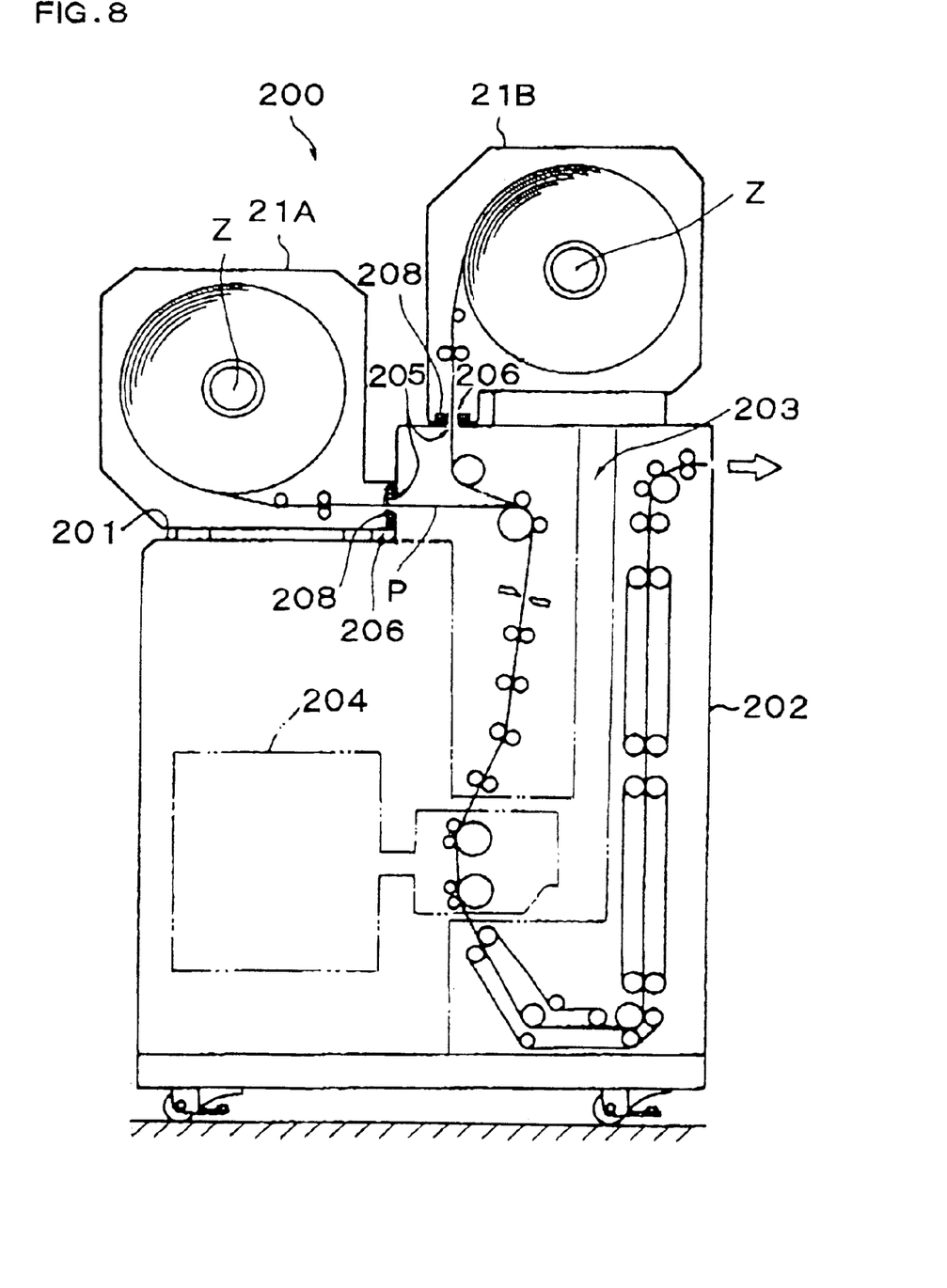
FIG. 8 is a schematic side view of the exposure module in a photographic processing apparatus according to another embodiment.

FIG. 8 illustrates an exposure processing module 200 of such a digital photographic processing apparatus for printing digital images on a printing material P (equivalent to the photosensitive material). The exposure processing module 200 comprises a magazine base 201 mounted on an apparatus frame 202, a first magazine 21A and a second magazine 21B mounted laterally in parallel to each other, each containing a roll of printing paper P supported rotatably about a roll axis Z, and a conveying means 203 for conveying the printing paper P. While the first magazine 21A and the second magazine 21B can be switched from one to the other for feeding the printing paper P, the printing paper P released from the first 21A or the second magazine 21B is subjected to a printing process in an image forming unit 204 disposed beneath the first magazine 21A.

A cutting mechanism 206 for maintenance task is provided as a movable member at the printing paper feed outlet 205 (equivalent to the photosensitive material feed outlet) of each of the first 21A and the second magazine 21B and while the photographic process being canceled, cuts the printing paper P conveyed along the transfer path.

The cutting mechanism 206 for maintenance task provided beside the first magazine 21A is now explained (the cutting mechanism 206 beside the second magazine 21B being identical to the cutting mechanism 206 beside the first magazine 21A).

Figure 9:
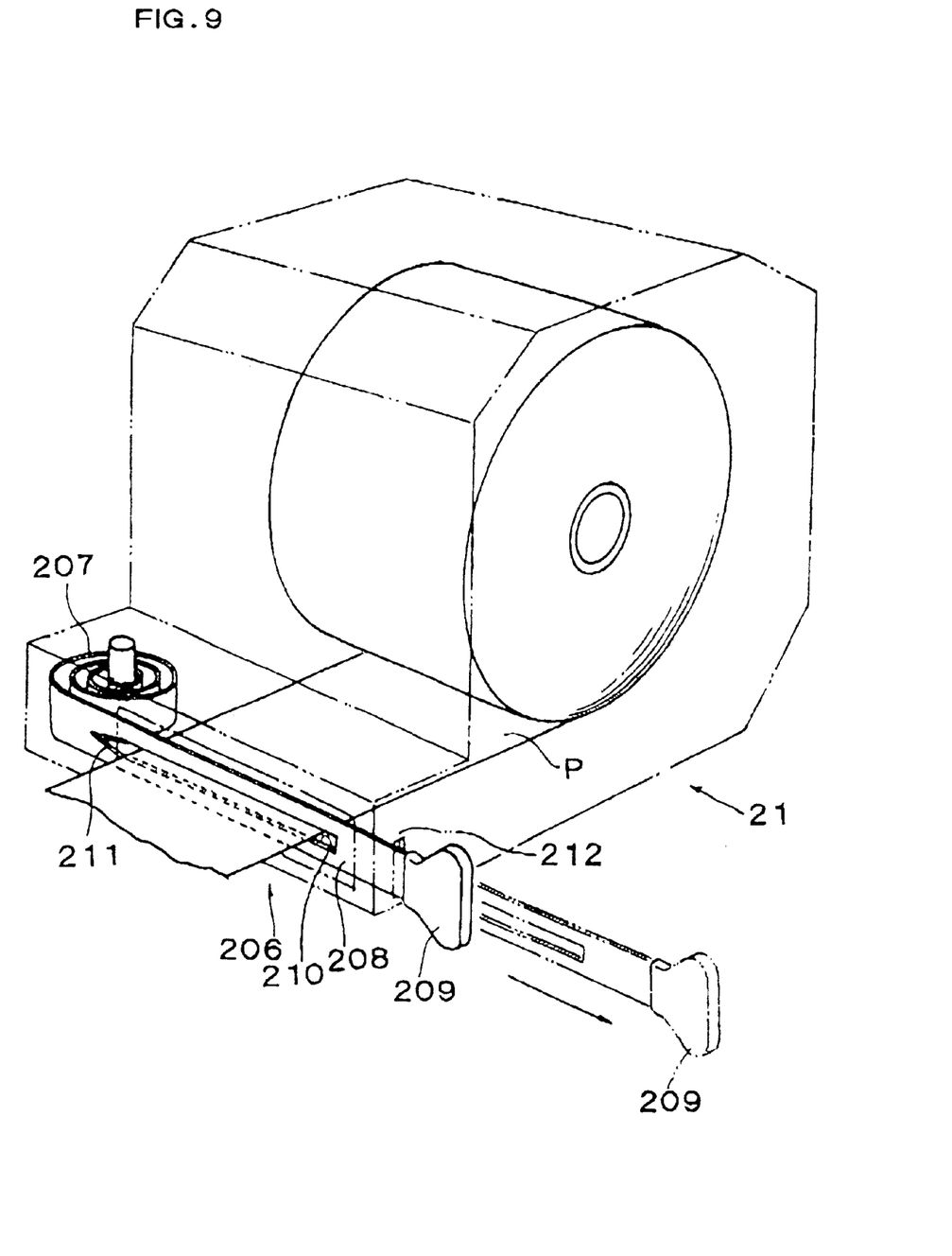
FIG. 9 is a perspective view showing a cutting mechanism for maintenance task at the magazine shown in FIG. 8.

As shown in FIG. 9, the cutting mechanism 206 comprises a coil spring 207 (equivalent to the urging means) mounted to one crosswise end of the first magazine 21A (along the widthwise direction of the printing paper P) of which the axis extends orthogonal to the conveying direction of the printing paper P, a manually operating knob 209 provided at the free end of a spring strip portion 208 (equivalent to the through slit provided member) of the coil spring 207, a through slit 210 provided in the spring strip portion 208 across the transfer path for allowing the printing paper P to run through, and a cutting blade 211 provided at one end of the through slit 210 to face widthwisely of the printing paper P for cutting the printing paper P. In action, when the spring strip portion 208 is moved from one position to the other, its blade 211 cuts the printing paper P running through the through slit 210.

A positioning means is provided for positioning the spring strip portion 208 so that the printing paper P can run through the through slit 210. The positioning means has a stopper 212 thereof for stopping the movement of the distal end of the knob 209 of the spring strip portion 208 driven by the yielding force of the coil spring 207.

The first magazine 21A containing the printing paper P is mounted on the magazine base 201 so that its feed outlet 205 coincides with the leading end of the printing paper P along the crosswise direction of the printing paper P. Accordingly, while the cutting mechanism 206 for maintenance task is located at the printing paper feed outlet 205 of the first magazine 21A, it allows an operator to pull the knob 209 to move the spring strip portion 208 along the widthwise direction of the printing paper P which extends across the through slit 210 of the spring strip portion 208. As a result, the printing paper P can be cut so that its leading end substantially coincides with the printing paper feed outlet 205.

The printing paper P is then conveyed to the photographic process unit after passed through the through slit 211 of the spring strip portion 208.

In case that the printing paper P is jammed at the downstream of the first magazine 21A, its feeding out from the first magazine 21A is halted and the spring strip portion 208 is moved along the widthwise direction of the printing paper P by the operator pulling the knob 209. Accordingly, the printing paper P extending across the through slit 210 of the spring strip portion 208 can be cut apart widthwisely thereof with the blade 211.

Then, a cut piece of the printing paper P at the downstream of the first magazine 21A is removed with the first magazine 21A dismounted from the magazine base 201.

Figure 10:
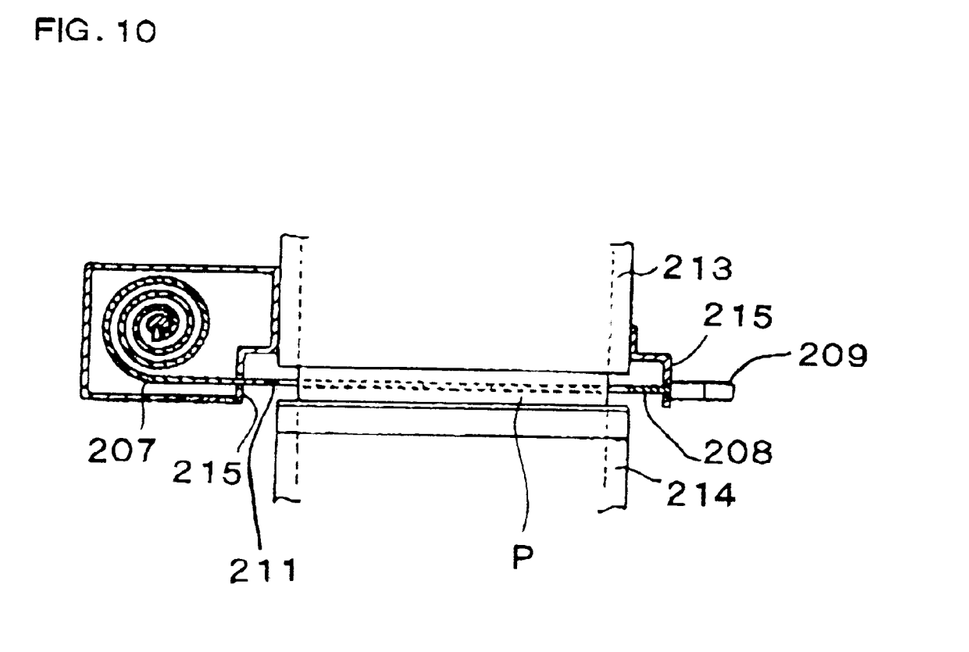
FIG. 10 is a cross sectional plan view of a cutting mechanism according to a further embodiment.
Figure 11:
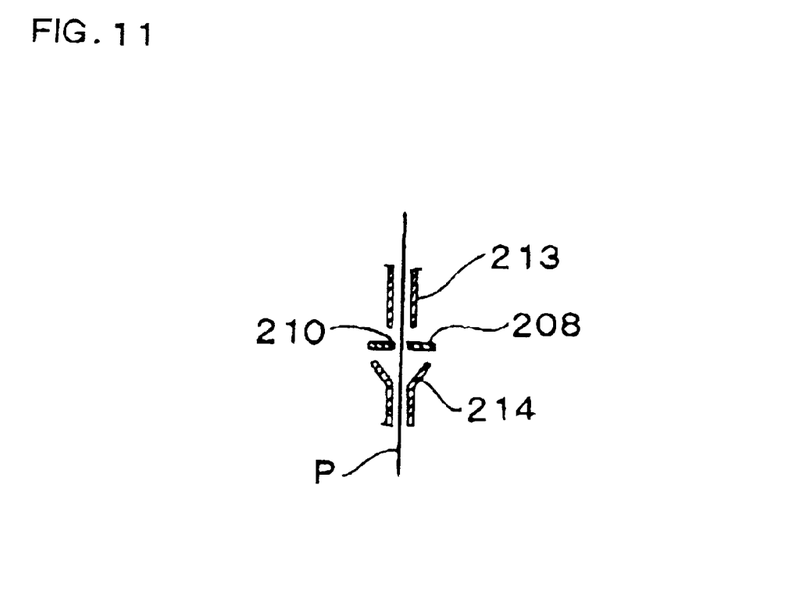
FIG. 11 is a partially cross sectional view of the cutting mechanism shown in FIG. 11.

(8) Referring to FIGS. 10 and 11, the cutting mechanism for maintenance task may be disposed between a first guide unit 213 and a second guide unit 214 provided adjacent to the first 21A and the second magazine 21B respectively.

While the stopper 212 is provided in the first guide unit 213, a slot for accepting the spring strip portion 208 of the coil spring 207 through is provided in a support 215 of the first guide unit 213.

In case that the printing paper P is jammed at the second guide unit 214 side, the photographic process is canceled and the spring strip portion 208 is moved widthwisely of the printing paper P by pulling the knob 209. Accordingly, the printing paper P extending across the through slit 210 of the spring strip portion 208 can be cut apart widthwisely thereof.

Then, covers about the first 213 and the second unit 214 are opened and a jammed portion of the printing paper P at the second unit 214 side can be removed.

(9) While the through slit 210 across which the printing paper P is conveyed is provided in the spring strip portion 208 of the coil spring 207 according to the embodiment, it may be formed in a separate strip member which is then joined by bolts to the coil spring 207.

It is understood that the urging means is not limited to the coil spring 207 and the photosensitive material is not limited to the printing paper.

While the present invention is not limited to the embodiments described above, any modification may be made without departing the scope of the present invention.

What is claimed is:

1. A cutting mechanism for a conveyed long sheet material comprising:
   a transfer path for conveying the sheet material in a lengthwise direction;
   a movable member having a slit provided in the transfer path, along a crosswise direction of the transfer path, said slit having a width longer than a lateral width of the sheet material to enclose the sheet material in the slit, said slit being formed with a pair of guiding plates facing each other between which the sheet material passes through, wherein the sheet material passes through the slit between the guiding plates at a first position, said movable member being reciprocally movable from the first position to a second position in the width direction of the sheet material;
   a blade provided at one inner end of the slit between the guiding plates for cutting the width of the conveyed sheet material as the movable member moves from the first position to the second position;
   a grip provided at one outer end of said slit in the width direction of the conveyed sheet material to pull said movable member along the width direction of the conveyed sheet material; and
   a holder provided in a direction of the reciprocal movement of the movable member for catching and stopping the movable member when moving beyond the first or second position.

2. The cutting mechanism according to claim 1, wherein the two plates are bent outwardly toward an upstream end of the transfer path.

3. The cutting mechanism according to claim 1, wherein said pair of guiding plates extend from the slit along a lengthwise direction of the conveyed sheet material.

4. A photosensitive material-containing magazine comprising:
   (a) a cutting mechanism provided with a movable member and disposed at a feed outlet of a conveyed sheet material for cutting the conveyed sheet material on a transfer path, wherein the movable member comprises:
      a through-slit provided member which is arranged for moving in a direction widthwisely of the conveyed sheet material and has a through-slit provided therein through which the sheet material is conveyed along the transfer path, said through-slit having a width longer than a lateral width of the sheet material to enclose the sheet material in the through-slit, said through-slit being formed with a pair of guiding plates facing each other between which the sheet material passes through, a blade provided between the guiding plates at one end of the through-slit thereof along the widthwise direction of the conveyed sheet material, wherein the conveyed sheet material extending across the through-slit can be cut with the blade as the through-slit member moves from one position to the other, and a knob provided at one outer end of said through-slit in a width direction of the conveyed sheet material to pull said movable member along the width direction of the conveyed sheet material; and (b) a holder provided in a direction of the widthwise movement of the movable member for catching and stopping the movable member when moving beyond the one position or the other position.

5. The photosensitive material-containing magazine according to claim 4, wherein said pair of guiding plates extend from the through-slit along a lengthwise direction of the conveyed sheet material.

6. A photosensitive material-containing magazine comprising:

(a) a cutting mechanism provided with a movable member and disposed at a feed outlet of a conveyed sheet material for cutting laterally a width of the conveyed sheet material on a transfer path, wherein the movable member comprises:

a through-slit provided member which is arranged for moving in a direction widthwisely of the conveyed sheet material and has a through-slit provided therein through which the sheet material is conveyed along the transfer path, said through-slit having a width longer than a lateral width of the sheet material to enclose the sheet material in the through-slit, said through-slit being formed with a pair of guiding plates facing each other between which the sheet material passes through, and a blade provided between the guiding plates at one end of the through-slit thereof along the widthwise direction of the conveyed sheet material, wherein the conveyed sheet material extending across the through-slit can be cut laterally with the blade as the through-slit member moves from one end to the other end of a lateral width of the conveyed sheet material, a knob provided at one outer end of said through-slit in the width direction of the conveyed sheet material to pull said movable member along the width direction of the conveyed sheet material, and (b) a holder provided in a direction of the widthwise movement of the movable member for catching and stopping the movable member when moving beyond the one position or the other position.

7. The photosensitive material-containing magazine according to claim 6, wherein said pair of guiding plates extend from the through-slit along a lengthwise direction of the conveyed sheet material.

8. A cutting mechanism for a conveyed long sheet material comprising:

a transfer path for conveying the sheet material in a lengthwise direction;

a movable member having a slit provided in the transfer path, along a crosswise direction of the transfer path, said slit having a width longer than a lateral width of the sheet material to enclose the sheet material in the slit, said slit being formed with a pair of guiding plates facing each other between which the sheet material passes through, wherein the sheet material passes through the slit between the guiding plates at a first position, said movable member being reciprocally movable from the first position to a second position in the width direction of the sheet material so as to move from one end to the other end of the lateral width of the conveyed sheet material;

a blade provided at one inner end of the slit between the guiding plates for cutting laterally the width of the conveyed sheet material as the movable member moves from the one end to the other end of the lateral width of the conveyed sheet material;

a grip provided at one outer end of said slit in the width direction of the conveyed sheet material to pull said movable member along the width direction of the conveyed sheet material; and a holder provided in a direction of the reciprocal movement of the movable member for catching and stopping the movable member when moving beyond the first or second position.

9. The cutting mechanism according to claim 8, wherein said pair of guiding plates extend from the slit along a lengthwise direction of the conveyed sheet material.

* * * * *